Jan. 5, 1960     H. S. V. JARUND     2,919,800
CONTAINERS FOR TETRAHEDRON SHAPED PACKAGES
Filed April 16, 1956     7 Sheets-Sheet 1
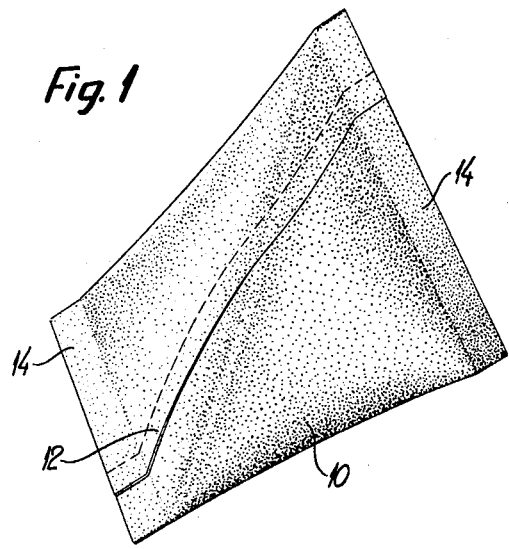
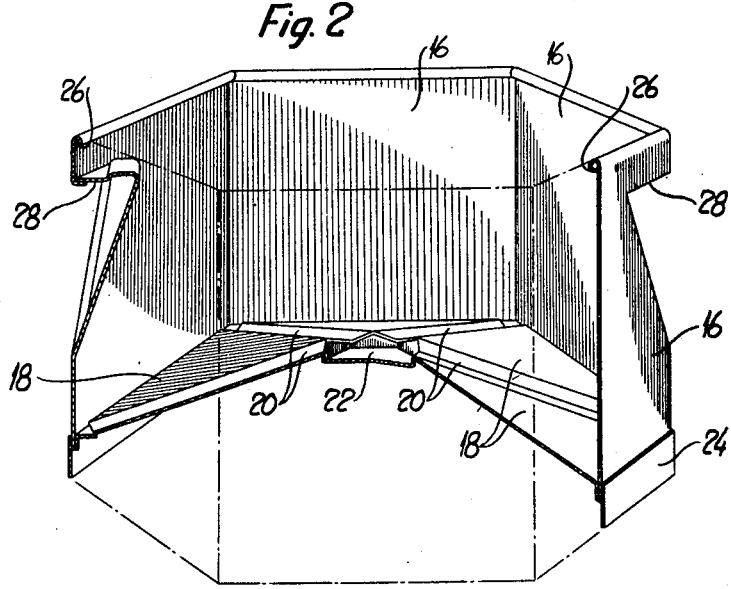
Inventor:
Harry Sigurd Valdemar Järund
Pierce, Scheffler + Parker
Attorneys.

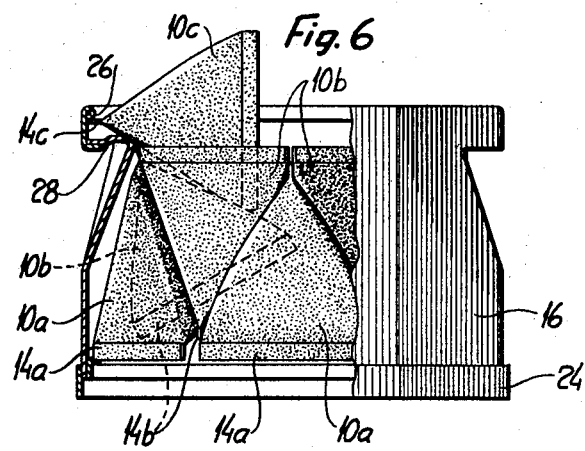
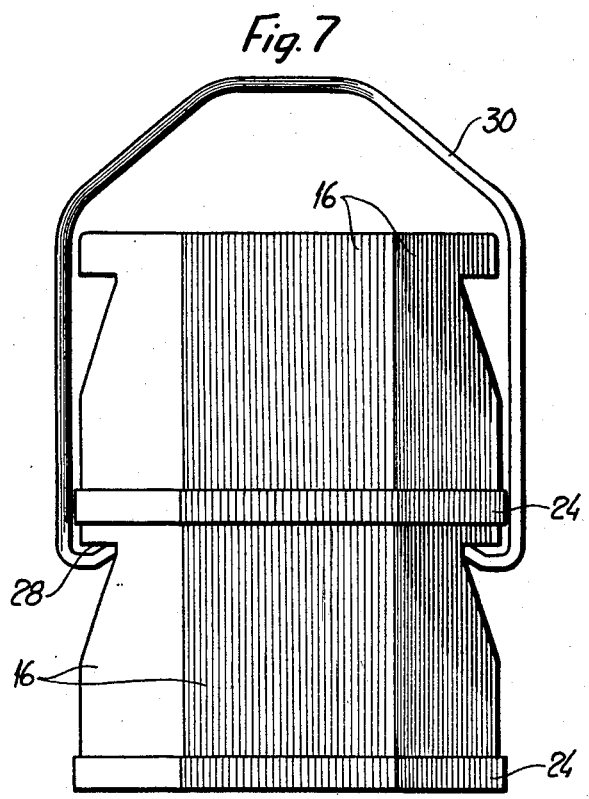

Jan. 5, 1960 H. S. V. JARUND 2,919,800
CONTAINERS FOR TETRAHEDRON SHAPED PACKAGES
Filed April 16, 1956 7 Sheets-Sheet 5

Inventor:
Harry Sigurd Valdemar Järund
Pierce, Scheffler & Parker
Attorneys.

Jan. 5, 1960     H. S. V. JARUND     2,919,800
CONTAINERS FOR TETRAHEDRON SHAPED PACKAGES
Filed April 16, 1956     7 Sheets-Sheet 6
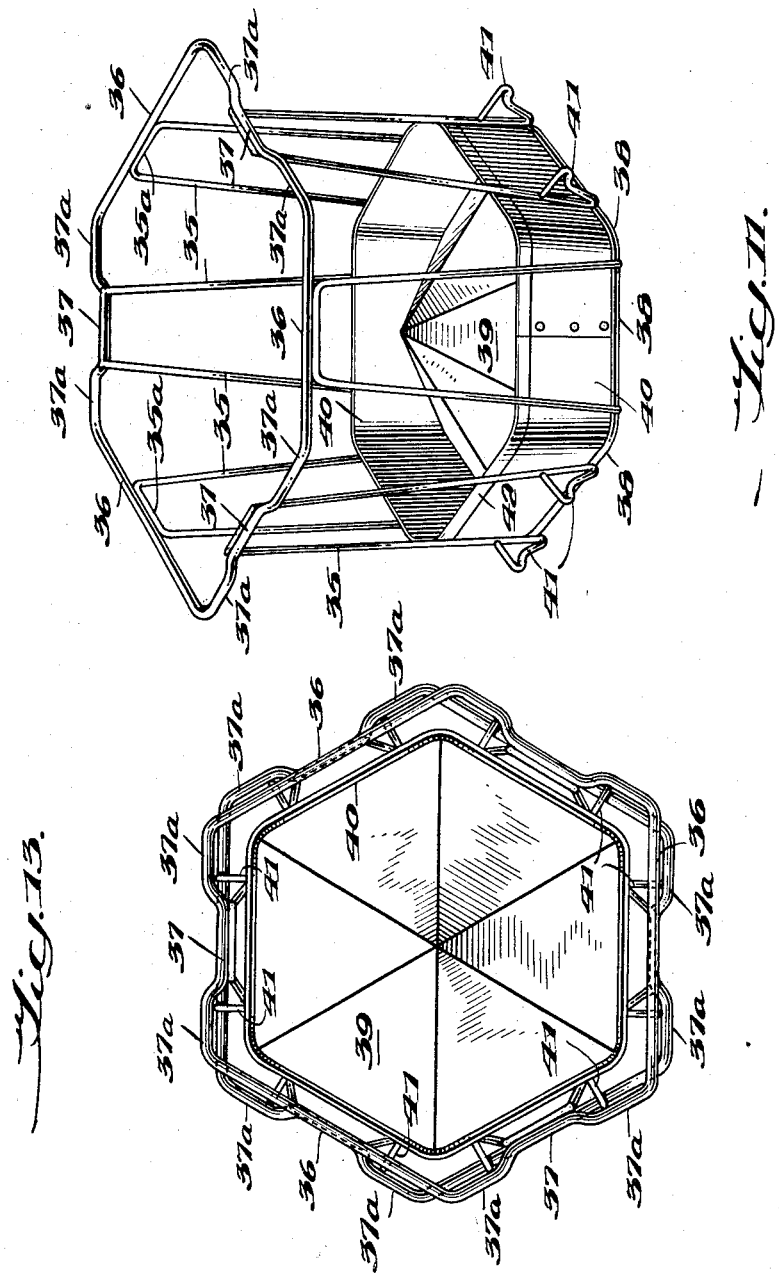
INVENTOR
Harry Sigurd Valdemar Jarund
BY Pierce, Scheffler & Parker
ATTORNEYS Jan. 5, 1960  H. S. V. JARUND  2,919,800
CONTAINERS FOR TETRAHEDRON SHAPED PACKAGES
Filed April 16, 1956  7 Sheets-Sheet 7
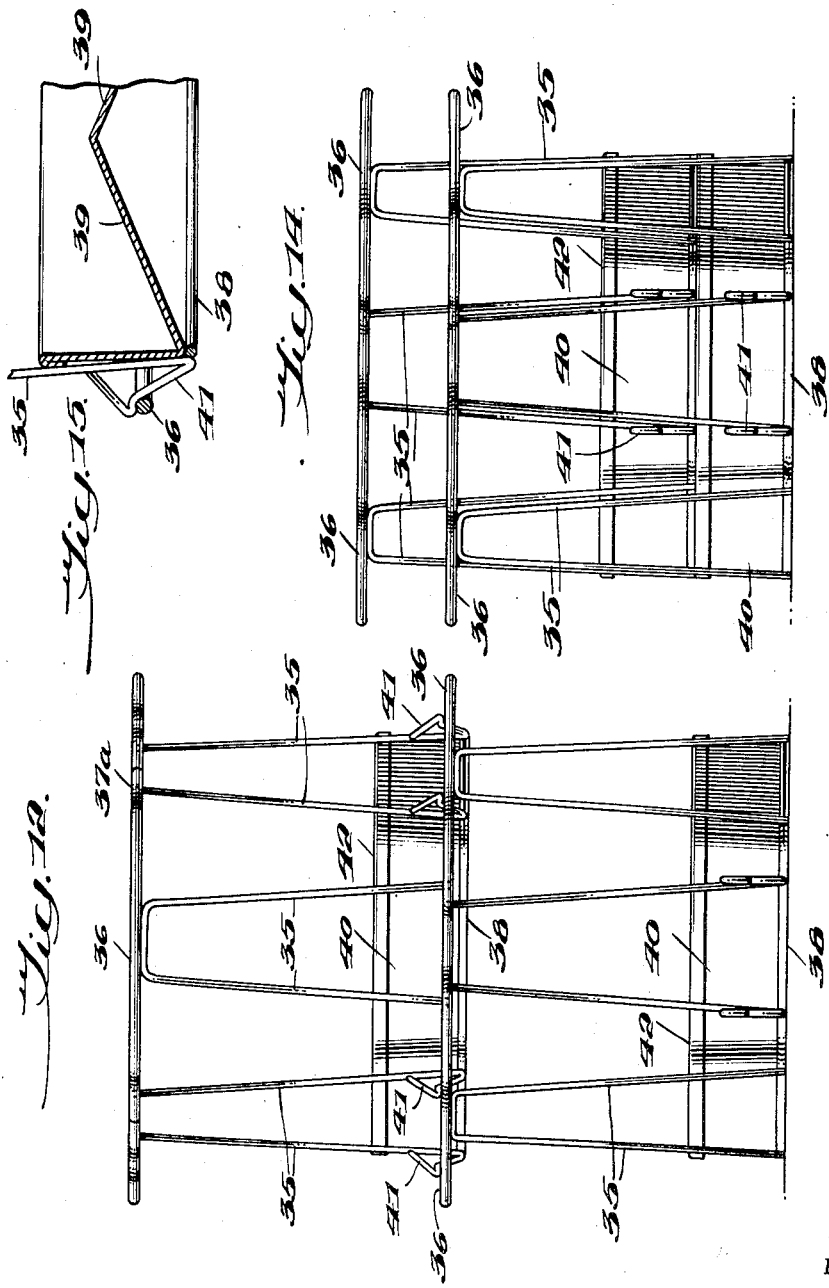
INVENTOR
Harry Sigurd Valdemar Jarund
BY Pierce, Scheffler & Parker
ATTORNEYS

United States Patent Office 2,919,800
Patented Jan. 5, 1960

2,919,800

CONTAINERS FOR TETRAHEDRON SHAPED PACKAGES

Harry Sigurd Valdemar Jarund, Lund, Sweden

Application April 16, 1956, Serial No. 578,236

Claims priority, application Sweden April 10, 1951

8 Claims. (Cl. 206—65)

The present invention relates to containers for packages in the shape of regular or approximately equilateral tetrahedrons and is a continuation-in-part of applications Serial No. 280,502, filed April 4, 1952, now abandoned, and Ser. No. 313,388, filed Oct. 7, 1952 Patent Number 2,742,181.

An object of the invention is to provide a container for tetrahedron shaped packages in which the tetrahedrons may easily be inserted in compact or close packing so that the container volume is well utilized. An object of the invention is to shape the container under consideration in such a way that, at the same time, it requires only a small amount of space in the case of stacking a plurality of containers upon and/or laterally of each other.

It has previously been proposed to form containers for tetrahedron shaped packages from plates welded together, the bottom wall and the top opening each having the shape of a regular pentagon, but the two pentagons being angularly offset with respect to each other in such a way that the corners of one are located midway of those of the other. The intended purpose of the pentagon form was to obtain a packing of maximum compactness, and it was obviously most natural to employ the regular pentagon as the fundamental element in the construction of such containers, since the central angle subtended by a side of the regular pentagon is almost equal to the edge angle of the regular tetrahedron (namely 72° for the central angle of the pentagon and somewhat more than 70° for the edge angle of the tetrahedron).

However, it is obvious that a container based on the equilateral pentagon cannot be given the shape of an equilateral prism if tetrahedrons are to be closely packed in the same, but that the triangular shape of the surfaces of the tetrahedron shaped packages must recur in some way or other in all of the boundary surfaces of the container. Such a container based on the pentagon will thus be difficult to manufacture and, in addition, will require a large amount of space when several containers are to be placed laterally of or upon each other, all contributing to enhancing the cost of the package.

The inconvenience attendant upon the use of the previously proposed containers for tetrahedral packages are avoided and the stated objects of the invention are attained by constructing the container on the basis of a hexahedral prism, for example, a regular one. At a cursory glance it may perhaps appear to be impossible to pack tetrahedron shaped articles compactly in a container which is in the form of a regular hexahedral prism, as six regular tetrahedrons with edge angles of about 70°, to be arranged in a circular array with the lateral faces two by two resting against each other, would require a center angle of more than 420°, i.e. considerably over a complete circle and therefore obviously impossible. The solution to this apparently impossible problem lies in providing the container with a bottom having supporting surfaces upon which the tetrahedrons of the lowermost layer rest, the supporting surface including substantially equilateral triangular elements directed inwardly and upwardly at an angle or alternatively inwardly and downwardly as a reflected image of the upwardly coned surface.

With the above in view, the container according to the invention is hence substantially characterized by the fact that it is formed as a hexahedral prism, the bottom of which is so shaped that its supporting triangular surfaces contacted by the lowermost layer of tetrahedrons form edge angles against the vertical walls of the prismatic container approximately equal to 70° i.e. the edge angle of a tetrahedron. To this end, the bottom may be in the form of an upright cone, the vertex angle of which will be approximately twice the edge angle of the tetrahedron or about 140°, or preferably in the form of a hexahedral pyramid having a corresponding vertex angle. If the pyramidal shape with upwardly directed vertex is chosen, the edge angle turned towards the interior of the container and situated between two adjacent triangle faces of the pyramidal bottom will be about three times as great as that of the tetrahedron. Also an intermediate form between the upright cone and the upright pyramid is usable, the outer contour of the bottom following the regular hexahedral cross-section of the container while the transverse sections through the bottom towards its vertex successively approach the contour of the circle. Irrespective of the type of the above stated principal forms of the bottom which is used, the bottom may be constructed to form an entire or a truncated cone or pyramid, or an intermediate form between these same.

The sides forming the container according to the invention may constitute the faces of a regular hexahedral prism or the sides may be slightly divergent from the bottom upward thus enabling the containers when empty to be nested so as to conserve storage space.

The invention will hereinafter be described more in detail with reference to the accompanying drawings, which by way of example but not in a limiting sense illustrate different embodiments of the container according to the invention, and in which:

Fig. 1 is a perspective view of a tetrahedron package;

Fig. 2 is a partial section perspective view of an embodiment of the container according to the invention;

Figure 4:
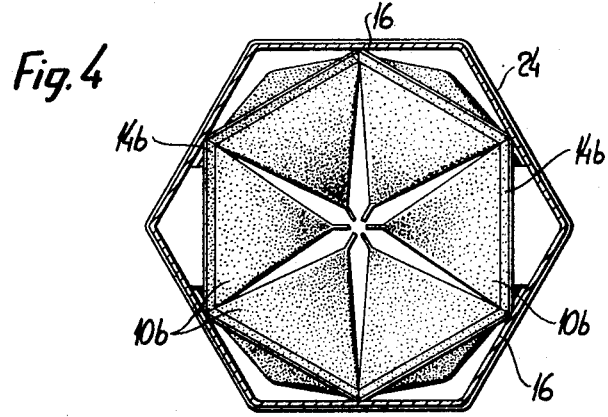
Figure 5:
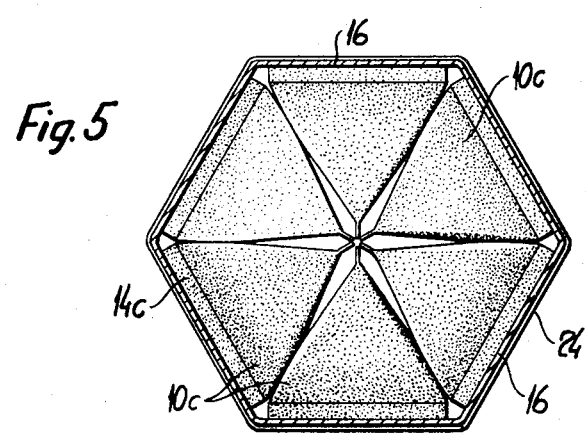
Figure 8:
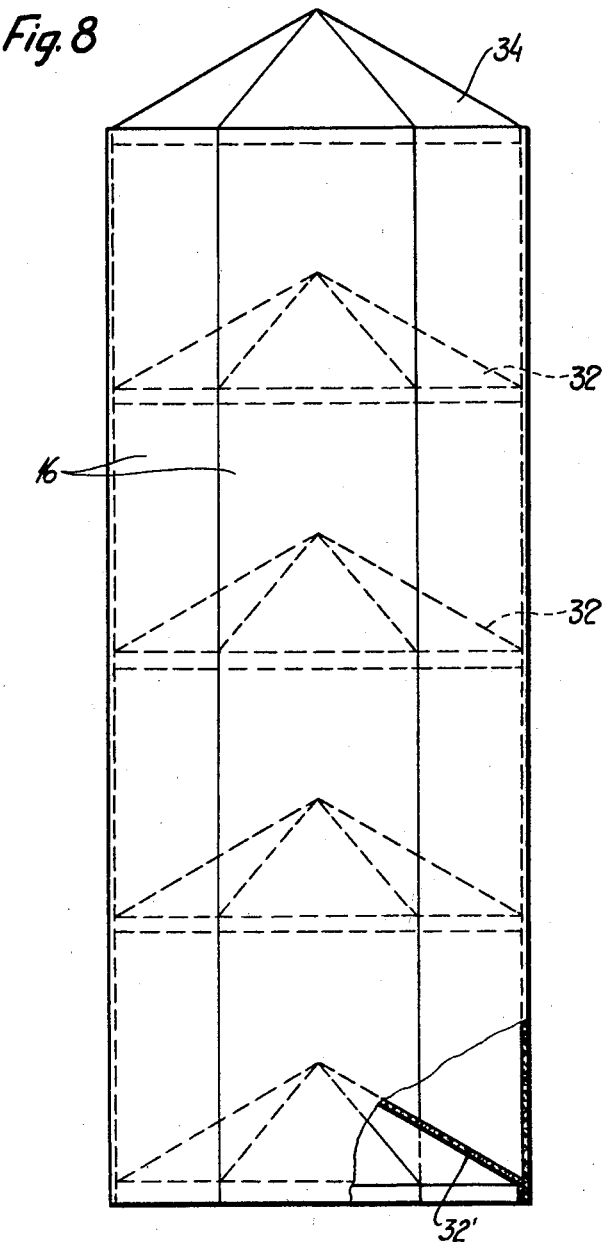
Figure 9:
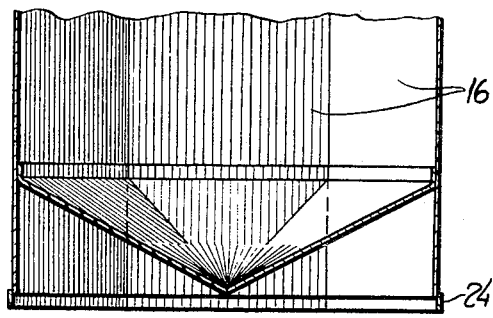
Figure 10:
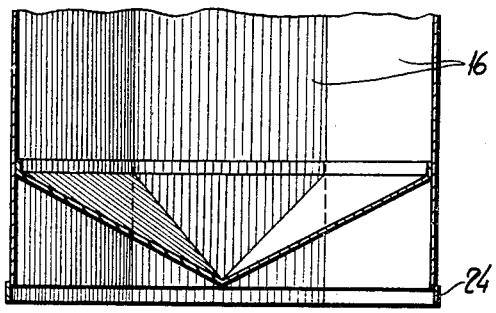

Fig. 4 showing the intermediate layer and Fig. 5 the uppermost layer of tetrahedrons put into the container;

Fig. 6 is a side elevation of a container, with parts broken away, and with the lower and intermediate layers of tetrahedrons in place and topped by one tetrahedron of the upper layer;

Fig. 7 shows two containers of the Fig. 2 type stacked upon each other;

Fig. 8 is a side elevation of a container of greater height and provided with inserted intermediate bottoms or separators;

Figs. 9 and 10 are fragmentary vertical sections of containers having bottoms of modified form; and Figs. 11 to 15, inclusive, are views of a further embodiment of a hexahedral container in accordance with the invention wherein the sides of the hexahedral container diverge from the bottom upward thus making it possible to nest the containers when empty so as to conserve storage space. Also, in this embodiment the container is "skeletonized," being made of wire thus saving weight and material.

Fig. 11 is a view in perspective of one of the skeletonized containers;

Fig. 12 is a view in side elevation showing two of the skeletonized containers when stacked one upon the other;

Fig. 13 is a top plan view of two stacked containers as shown in Fig. 12;

Fig. 14 is a view in side elevation showing two of the skeletonized containers when one is nested partly within the other; and Fig. 15 is a fragmentary vertical section showing a detail of the manner in which the lower rim portion of one container is supported upon the upper rim portion of another container.

The regular tetrahedrons 10 which are to be packed in containers according to the invention and which preferably have the appearance shown in Fig. 1, may be formed from a tube or the like having a longitudinal seal 12 by alternately flat-pressing and sealing together the same in two directions perpendicular to each other and then cutting through the tube at the sealing joints perpendicular to each other, whereby two opposite plane sealing edges 14 are obtained and the remaining edges are somewhat rounded.

The container shown in Figs. 2 to 6 is formed as a regular hexahedral prism having six substantially rectangular vertical walls 16 and a bottom, which principally consists of a pyramid defined by six substantially congruent equilateral triangular faces 18. Preferably, the edges between the triangular faces of the bottom pyramid are bent down, as shown at 20, and similarly the vertex of the pyramid may be bent down, as indicated at 22, to receive the edges 14 of tetrahedrons of the intermediate layer so that these edges will not bear on the bottom and thereby be subjected to an unsuitable load. Furthermore, around the bottom portion of the container there is provided, in this embodiment, a strengthening flange 24 in such a manner that it fits on the top of the upper edge of another container and thus serves as a support when several containers are stacked upon each other, as indicated in Fig. 7. The flange 24 is adapted also to serve as a shelter from rain or the like so that the water flows down the outside of the lower container or containers of a stack. Besides, in order to give the container an increased stability the upper edge 26 may be folded or rolled inwardly. The fold 26 has also for its purpose to retain the tetrahedrons which have been piled in the container in a manner more fully described in the following.

To facilitate lifting and manual transport of the containers these are provided on at least two opposite vertical edges and preferably, though not shown, at all of them, with recesses or depressions 28, which may serve as handles or as receivers for a carrying bail 30 (Fig. 7) or the like and which also give stability to the container and may be formed as supports for the intermediate bed of tetrahedrons packed in the manner described below.

Figure 3:
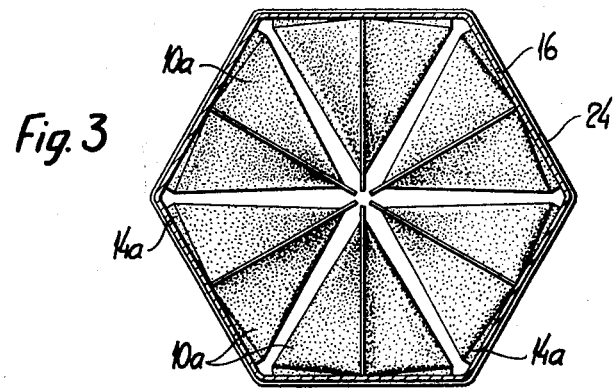
Figs. 3 to 5 show a container according to Fig. 2, as viewed from above in different stages of filling with tetrahedrons, Fig. 3 showing the bottom layer.

The insertion of tetrahedrons into the container above described is effected in the following manner:

First a bottom layer of six tetrahedrons 10a is put into the container in the manner apparent from Fig. 3 so that each regular tetrahedron 10a, the sides of which are identical and are equilateral triangles, has one flat surface resting against one of the triangular faces 18 of the bottom pyramid and a flat-pressed sealing edge 14a along the edge between the bottom and one of the vertical walls 16, the width of the sealing edge 14, i.e. the base of this equilateral triangular face of the tetrahedron being equal to the width of one side of the container. The other tetrahedron face extending from the same sealing edge 14a will then substantially follow the vertical wall 16, as the edge angle between this wall and the bottom is substantially equal to the edge angle of the tetrahedron, namely substantially 70°.

Thus, between the tetrahedrons 10a in the bottom layer above described there are formed wedge shaped interspaces, the wedge angle of which substantially corresponds to the edge angle of the tetrahedrons, as the inwardly extending edge angle between two adjacent triangle faces of the pyramidal bottom is equal to three times the tetrahedron edge angle. Into these wedge shaped interspaces are inserted, as shown in Fig. 4, six tetrahedrons 10b which form the intermediate layer. The lower end of each centrally located downwardly extending flat-pressed sealing edge 14b of each tetrahedron 10b in the intermediate layer will thus extend downwardly into the bent-down portion or groove 22 between the triangular faces 18 of the pyramidal bottom so that each tetrahedron 10b in the intermediate layer will substantially rest, face to face, against two adjacent tetrahedrons 10a in the bottom layer. The outer and horizontally arranged sealing edges 14b of the tetrahedrons of the intermediate layer will span the junctions of adjacent vertical walls of the container with their outer ends at approximately the vertical center line of those walls.

The third or uppermost layer of tetrahedrons 10c is placed as shown in Fig. 5, one sealing edge 14c in horizontal position being pressed down below the upper fold 26 of the container, the opposite sealing edge being directed substantially along the vertical center line of the container. Finally, the upper layer may, if desired, be provided with a cover, not shown, of the same configuration as the bottom and preferably formed with resilient edge flaps which may be pressed downwardly to engage below the fold 26 for the purpose of fastening the cover in place.

The relative locations of the tetrahedrons in the different layers is shown in Fig. 6. The fragmentary side elevation of Fig. 6 also shows how, in the described packing method, a suitable free space is obtained inside the opposite edges for the formation of the handles or carrying bail attachments 28.

The container according to the invention may also advantageously be built with a greater height than described with reference to the aforesaid embodiment. However, the height should always be a whole multiple of that container height which is required for three layers of tetrahedrons packed in the manner above described. Fig. 8 shows an embodiment of such a container for four sets of three layers of tetrahedrons, there being inserted an intermediate bottom or separator 32 of approximately the same shape as the fixed pyramidal bottom 32' after every third layer. The intermediate bottoms 32 may be loosely inserted and may, if desired, rest against lugs provided on the vertical container walls.

When containers constructed according to the invention are formed of paperboard or similar material, it may be suitable to secure the lowermost bottom to the container walls only along two opposite edges, while the remaining four edges are entirely free. By such an arrangement it is possible to flat-press the empty container for facilitating the transport from the manufacturer of the containers and the return freight of containers used. Of course, for the same purpose it is possible also to insert the lowermost bottom loosely, in which event it may be supported by an internal flange or by a suitable number of abutments or the like at the lower edge of the vertical walls of the container.

As mentioned in the introduction to the specification, both the lowermost bottom and the intermediate bottoms may have another shape than that of the upright hexahedral pyramid. Two different embodiments of feasible bottoms are shown in Figs. 9 and 10, Fig. 9 showing the intermediate form between pyramid and cone and Fig. 10 purely pyramidal bottom. In these figures, the bottoms are shown unbroken but, of course, the invention also contemplates containers provided with bottoms truncated in a manner similar to that illustrated in Fig. 2. At the same time, in these figures the bottoms are shown with downwardly directed vertices in order to illustrate this modification of the orientation of the bottom, while the container walls have been extended downwardly so that the container in upright position rests against the lower edges of the walls reinforced by means of the flange 24. Of course, by truncating the bottom vertices also the downward extension of the side walls may be made shorter.

In the embodiments of the invention so far described, the sides of the container, are seen to be constituted by imperforate walls. If desired, the walls forming the sides and also the bottom of the container may be perforated to lessen the weight and reduce the amount of material. To further reduce the weight and material required for the containers, the sides thereof may be made from generally upright, relatively rigid wire rodding, and the lower and upper hexagonal edges also made of rodding. The pyramidal base may be constituted by imperforate or perforate plate material, and the lower portions of the sides may be reinforced by a hexagonal band of plate material to help the container maintain its shape.

Also, in the embodiments so far described, the sides of the container have been vertical with respect to a plane transverse to the axis of symmetry of the pyramidal bottom. Thus the container has the shape of a regular hexahedral prism. With the sides vertical, it is impossible to nest the containers when empty each within the other to conserve space. To permit the nesting of containers when empty, it is therefore possible within the present inventive concept to arrange the container sides so that they taper outwardly in the upward direction from the base, the construction also being such as to permit the containers when filled with the tetrahedron packages to be stacked one upon the other and yet avoid the setting up of any forces that would tend to crush any of the tetrahedron packages.

In the embodiment shown in Figs. 11 to 15 the container is made from wire rodding, the sides are tapered outwardly and the rim portions of the containers are arranged in such manner that the containers may be nested within each other when empty and also stacked upon each other when filled with three layers of congruent, regular tetrahedron packages. With reference now to these views it will be seen that the container includes six sides each of which is constituted by an inverted U-shaped wire rod 35 of sufficient diameter to give it a reasonably rigid characteristic. The upper, bridging portions 35a of these U-shaped members are secured as by welding to correspondingly positioned sides 36, 37 of the top hexagonal rim portion of the container, this rim being formed from a continuous length of rod material which can be the same diameter as that used for the sides but preferably is made of slightly greater diameter to impart more rigidity to the container. The top rim is formed by bending into the substantially hexagonal shape, as shown in the drawing, and it will be seen that every other side 36 is rectilinear while the end portions of the intervening sides 37 are offset outwardly at 37a.

The bottom rim portion of the container is somewhat similar to the top rim, being likewise formed from a continuous length of rod bent into hexagonal form to establish six straight sides 38 which are secured as by welding to the bottom ends of the leg portions of the U-shaped rod sides 35.

The container bottom has the configuration of a six-sided pyramid, the sides being congruent, and each side being in the form of an equilateral triangular plate member 39. The base edge of each plate member 39 is suitably secured to the corresponding side 38 of the bottom rim thus securing the container bottom in place. The vertex of the pyramidal bottom is located above the plane transverse to the axis of symmetry and containing the base edges of the triangular plate members 39. As in the other embodiments, the regular tetrahedron package to be placed in the container will have an equilateral triangular surface substantially congruent with the triangular plate members 39 forming the bottom, and the angle between each plate member 39 and a plane containing the corresponding U-shaped wire rod side is equal to the edge angle of such a tetrahedron, which is substantially 70°. In order to prevent the ends of the sealed edges of the tetrahedron packages in the bottom layer from slipping out of place at the junction of the container sides with the bottom, plate members 40 may span the gap between the bottom ends of the legs of the U-shaped rod sides 35 in this region, the ends of the plates 40 being secured, as by welding, to the rod sides 35.

So that the containers when filled with a plurality of layers of tetrahedron packages may be stacked upon each other, it will be seen that the lower portions of such of those side rods 35 as are joined to the sides 37 of the top rim are turned back upon themselves to form hooks 41 which rest upon the rectilinear sides 36 of the top rim of a like container, as shown in Fig. 12. To nest the containers when empty, it is only necessary to orient each container relative to the one next below so that the hooks 41 of an upper container are aligned with the outwardly offset end portions 37a of the top rim of the container next-below. In this manner, the hooks 41 have sufficient clearance to pass by the sides of the top rim of the container next-below and the containers can be nested as indicated in Fig. 14.

To prevent the containers, when nested, from becoming jammed within each other, it will be seen that each container includes a generally hexagonal loop 42 of strip material arranged horizontally and extending around and being secured to the rod sides 35, such as by welding, at a distance from the bottom of the container equal to about one third the height of the container. As the containers are nested, the bottom of one container engages and is stopped by the upper edge of the sides of the hexagonal loop 42, thus preventing any further penetration of one container within the other.

In conclusion, it will be evident that I have provided an improved form of container wherein a plurality of layers of regular tetrahedron shaped packages may be packed for transport. The embodiments that have been illustrated are deemed to be typical rather than exhaustive of the constructions possible and hence various modifications may be made without departing from the spirit and scope of the invention as defined in the appended claims.

I claim:

1. A container for and filled with packages in the form of substantially regular tetrahedrons, said container comprising plane sides arranged so as to define a substantially regular hexagon in transverse section and a bottom constituted by six adjacent plane surfaces the base edges of which are coextensive with and intersect the lower edges of corresponding sides in a plane substantially transverse to the axis of symmetry of the container, said bottom surfaces constituting at least a truncated portion of a substantially regular pyramid the sides of which are substantially congruent with the sides of said tetrahedrons and the angle between each of said bottom surfaces and its corresponding side being substantially 70°, a bottom layer of six of said tetrahedrons resting respectively upon corresponding surfaces of said container bottom and two more layers of said tetrahedrons supported upon said bottom layer, the tetrahedrons constituting the layer next to said bottom layer each being disposed in the space between adjacent tetraherons of said bottom layer and having a horizontally arranged edge with the ends thereof located approximately at the centers of two adjacent sides of said container.

2. A container for and filled with tetraheron packages as defined in claim 1 wherein said bottom surfaces extend upwardly from said transverse plane.

3. A container for and filled with tetrahedron packages as defined in claim 1 wherein said bottom surfaces extend upwardly from said transverse plane and the sides of said container extend vertically upward from said transverse plane.

4. A container for and filled with tetrahedron packages as defined in claim 1 wherein said bottom surfaces extend upwardly from said transverse plane and the sides of said container diverge upwardly from said transverse plane.

5. A container for and filled with tetrahedron packages as defined in claim 1 wherein the edge portions between adjacent plane surfaces of said bottom are depressed.

6. A container for and filled with tetrahedron packages as defined in claim 1 wherein said plane surfaces of said bottom merge into a depressed vertex portion and the edge portions between adjacent bottom surfaces are likewise depressed and merge with said depressed vertex portion.

7. A container for and filled with tetrahedron packages as defined in claim 1 wherein said plane surfaces of said bottom merge into a conical vertex.

8. A container for and filled with tetrahedron packages as defined in claim 1 wherein said plane surfaces of said bottom extend upwardly from said transverse plane and said container sides diverge upward from said transverse plane, said container sides being constructed from relatively rigid rod material reinforced at the top and bottom with hexagonally shaped rims also made from rod material, said top hexagonal rim having three rectilinear sides alternating with three sides having their end portions offset in an outward direction, and the sides of said container at said bottom hexagonal rim coordinated to those sides of said top rim having offset end portions being provided with hook means adapted to rest upon the rectilinear sides of the top hexagonal rim of a like container.

References Cited in the file of this patent

UNITED STATES PATENTS

| | | |
|---|---|---|
| 77,280 | Hadden | Apr. 28, 1868 |
| 1,380,066 | Johnson | May 31, 1921 |
| 1,649,088 | Tinsley | Nov. 15, 1927 |
| 1,862,609 | Shaw | June 14, 1932 |
| 2,002,493 | Einson | May 28, 1935 |
| 2,120,871 | Rudowitz | June 14, 1938 |
| 2,133,336 | Ziemmerman | Oct. 18, 1938 |
| 2,352,393 | Lee | June 27, 1944 |
| 2,493,163 | Rausing | Jan. 3, 1950 |
| 2,575,149 | Watson | Nov. 13, 1951 |

FOREIGN PATENTS

| | | |
|---|---|---|
| 200,935 | Great Britain | July 26, 1933 |
| 505,526 | Great Britain | May 12, 1939 |
| 588,343 | Great Britain | May 20, 1947 |
| 609,142 | Great Britain | Sept. 27, 1948 |
| 303,118 | Switzerland | Jan. 17, 1955 |